(12) United States Patent
Li et al.

(10) Patent No.: US 11,780,998 B2
(45) Date of Patent: Oct. 10, 2023

(54) THERMOPLASTIC POLYOLEFIN COMPOSITIONS USEFUL FOR ODOR REDUCTION

(71) Applicant: Dow Global Technologies LLC, Midland, MI (US)

(72) Inventors: Haiying Li, Shanghai (CN); Shaoguang Feng, Shanghai (CN); Andong Liu, Shanghai (CN); Yonghua Gong, Shanghai (CN); Jian Zou, Shanghai (CN); Xiuhan Yang, Shanghai (CN); Xuemei Zhai, Shanghai (CN)

(73) Assignee: Dow Global Technologies LLC, Midland, TX (US)

( * ) Notice: Subject to any disclaimer, the term of this patent is extended or adjusted under 35 U.S.C. 154(b) by 325 days.

(21) Appl. No.: 17/298,573

(22) PCT Filed: Nov. 29, 2018

(86) PCT No.: PCT/CN2018/118091
§ 371 (c)(1),
(2) Date: May 30, 2021

(87) PCT Pub. No.: WO2020/107302
PCT Pub. Date: Jun. 4, 2020

(65) Prior Publication Data
US 2022/0010111 A1    Jan. 13, 2022

(51) Int. Cl.
| | | |
|---|---|---|
| *C08L 23/12* | (2006.01) | |
| *C08K 5/00* | (2006.01) | |
| *C08K 5/07* | (2006.01) | |
| *C08K 5/17* | (2006.01) | |
| *C08L 23/08* | (2006.01) | |

(52) U.S. Cl.
CPC ............. *C08L 23/12* (2013.01); *C08K 5/005* (2013.01); *C08K 5/07* (2013.01); *C08K 5/175* (2013.01); *C08L 23/0815* (2013.01); *C08L 2205/03* (2013.01); *C08L 2207/04* (2013.01)

(58) Field of Classification Search
CPC ................................. C08L 23/12; C08L 23/14
See application file for complete search history.

(56) References Cited

U.S. PATENT DOCUMENTS

| | | | |
|---|---|---|---|
| 2,495,286 A | 1/1950 | Brubaker et al. | |
| 3,684,778 A | 8/1972 | Hammer | |
| 5,272,236 A | 12/1993 | Lai et al. | |
| 5,278,272 A | 1/1994 | Lai et al. | |
| 5,986,028 A | 11/1999 | Lai et al. | |
| 8,053,529 B2 | 11/2011 | Carnahan et al. | |
| 8,686,087 B2 | 4/2014 | Li Pi Shan et al. | |
| 8,716,400 B2 | 5/2014 | Carnahan et al. | |
| 10,196,493 B2 | 2/2019 | Otero Martinez et al. | |
| 2004/0081795 A1 | 4/2004 | Wang et al. | |
| 2013/0145962 A1* | 6/2013 | Gupta | C08K 5/34 524/110 |
| 2016/0145427 A1* | 5/2016 | Eng | C08K 5/3475 252/403 |

FOREIGN PATENT DOCUMENTS

| | | |
|---|---|---|
| CN | 1548164 | 11/2004 |
| CN | 103551028 | 2/2014 |
| EP | 0134501 | 3/1985 |
| JP | 48017755 | 5/1973 |
| WO | 2011/023594 | 3/2011 |
| WO | 2016/028961 | 2/2016 |
| WO | 2017/044547 | 3/2017 |
| WO | 2018/148959 | 8/2018 |

OTHER PUBLICATIONS

PCT/CN2018/118091, International Search Report and Written Opinion dated Sep. 2, 2019.

* cited by examiner

*Primary Examiner* — Jeffrey C Mullis

(57) ABSTRACT

The present disclosure relates to a thermoplastic polyolefin composition comprising: (A) a polypropylene polymer; (B) an elastomer component; (C) an additive component; and (D) a scavenger component comprising a polyacetoacetate compound having the Formula (I) defined herein and an amino alcohol compound having the Formula (II) defined herein. The present disclosure also relates to an article made from the thermoplastic polyolefin composition.

13 Claims, No Drawings

THERMOPLASTIC POLYOLEFIN COMPOSITIONS USEFUL FOR ODOR REDUCTION

FIELD

Embodiments relate to thermoplastic polyolefin compositions useful for odor reduction. Such compositions are further useful for aldehyde abatement, as well as maintaining or improving the balance of mechanical properties.

BACKGROUND

Automobile interior parts are typically made of thermoplastic polyolefin (TPO) compositions, such as TPO compositions containing polyolefin elastomers (POE). Increasing consumer concerns regarding car interior air quality have led to government regulations that limit the concentration of volatile organic compounds (VOCs), such as aldehydes, permissible in automobile interior parts. Apart from the reduction of VOCs, it is important that odor is reduced or not increased and that the mechanical properties important for automobile interior parts are maintained or improved. The present compositions address such a need in the state of the art.

SUMMARY

In certain embodiments, the present disclosure relates to a thermoplastic polyolefin composition comprising:
(A) a polypropylene polymer;
(B) an elastomer component;
(C) an additive component; and
(D) a scavenger component comprising a polyacetoacetate compound and an amino alcohol compound, wherein:
the polyacetoacetate compound has the Formula (I):

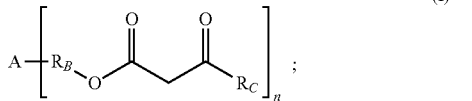

the amino alcohol compound has the Formula (II):

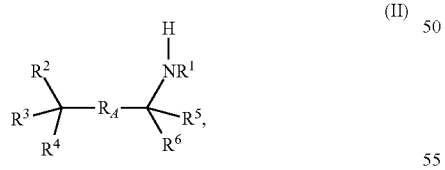

or a salt thereof; and, wherein:
A is a polymer backbone, a $C_1$-$C_{30}$ substituted or unsubstituted linear or branched alkyl, aryl, arylalkyl, or alkaryl group, wherein the substituents may be one or more O, N, S, halogen, or phosphine;
$R_B$ is a bond or a $C_1$-$C_{30}$ linear or branched alkyl, aryl, arylalkyl, or alkaryl group;
$R_C$ is a substituted or unsubstituted $C_1$-$C_6$ alkyl group or a substituted or unsubstituted aryl group;
n is a number from 2 to 100;
$R_A$ is a bond or is $C(R^7R^8)$;
$R^1$ is H, OH or a $C_1$-$C_6$ alkyl group;
$R^2$ is H, OH or a $C_1$-$C_6$ alkyl group;
$R^3$, $R^4$, $R^5$, and $R^6$ are independently H or a $C_1$-$C_6$ alkyl group;
$R^7$ and $R^8$ are independently H, OH or a $C_1$-$C_6$ alkyl group;
wherein the $C_1$-$C_6$ alkyl group in $R^1$ to $R^8$ is optionally independently substituted with OH, $NR^9R^{10}$, a $C_1$-$C_6$ alkyl group, or a phenyl group, wherein $R^9$ and $R^{10}$ are independently H or a $C_1$-$C_6$ alkyl group, and
provided that if neither $R^7$ nor $R^8$ is OH, then at least one of $R^1$ and $R^2$ is OH.

Optionally, in certain embodiments, the composition of the present disclosure may further comprise (E) a compatibilizer.

In further embodiments, the present disclosure relates to a thermoplastic polyolefin composition comprising:
(A) from 29.99 wt % to 99.99 wt % of a polypropylene polymer;
(B) from 0 wt % to 70 wt % of an elastomer component;
(C) from 0 wt % to 40 wt % of an additive component; and
(D) from 0.01 wt % to 5 wt % of a scavenger component comprising a polyacetoacetate compound and an amino alcohol compound, wherein:
the polyacetoacetate compound has the Formula (I):

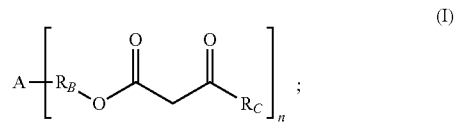

the amino alcohol compound has the Formula (II):

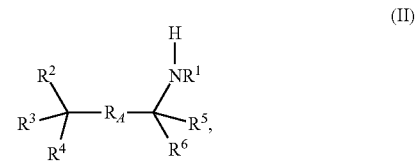

or a salt thereof; and, wherein:
A is a polymer backbone, a $C_1$-$C_{30}$ substituted or unsubstituted linear or branched alkyl, aryl, arylalkyl, or alkaryl group, wherein the substituents may be one or more O, N, S, halogen, or phosphine;
$R_B$ is a bond or a $C_1$-$C_{30}$ linear or branched alkyl, aryl, arylalkyl, or alkaryl group;
$R_C$ is a substituted or unsubstituted $C_1$-$C_6$ alkyl group or a substituted or unsubstituted aryl group;
n is a number from 2 to 100;
$R_A$ is a bond or is $C(R^7R^8)$;
$R^1$ is H, OH or a $C_1$-$C_6$ alkyl group;
$R^2$ is H, OH or a $C_1$-$C_6$ alkyl group;
$R^3$, $R^4$, $R^5$, and $R^6$ are independently H, or a $C_1$-$C_6$ alkyl group;
$R^7$ and $R^8$ are independently H, OH or a $C_1$-$C_6$ alkyl group;
wherein the $C_1$-$C_6$ alkyl group in $R^1$ to $R^8$ is optionally independently substituted with OH, $NR^9R^{10}$, a $C_1$-$C_6$ alkyl group, or a phenyl group, wherein $R^9$ and $R^{10}$ are independently H or a $C_1$-$C_6$ alkyl group, and
provided that if neither $R^7$ nor $R^8$ is OH, then at least one of $R^1$ and $R^2$ is OH.

Optionally, in certain embodiments, the composition of the present disclosure may further comprise from 0 wt % to 10 wt % of (E) a compatibilizer.

DETAILED DESCRIPTION

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value, as well as decimal values. For ranges containing explicit values (e.g., 1 to 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

An "elastomer" is a polymer that experiences large reversible deformations under relatively low stress. Elastomers can either be thermoplastic or thermoset. "Thermoplastic elastomers" are elastomers having thermoplastic properties. That is, thermoplastic elastomers are optionally molded or otherwise shaped and reprocessed at temperatures above their melting or softening point. The polyolefin elastomers suitable for use herein are thermoplastic elastomers.

An "ethylene-based polymer," "ethylene polymer," "polyethylene" or like terms mean a polymer that contains equal to or greater than 50 wt %, or a majority amount of, polymerized ethylene monomer (based on the total weight of the polymer) and, optionally, may contain at least one comonomer.

An "ethylene/α-olefin polymer" or "ethylene/alpha-olefin polymer" is a polymer that contains equal to or greater than 50 wt %, or a majority amount of, polymerized ethylene, based on the weight of the polymer, and one or more alpha-olefin comonomers.

A "homopolymer" is a polymer comprising repeating units derived from a single monomer type, but does not exclude residual amounts of other components used in preparing the homopolymer, such as chain transfer agents.

"Olefin polymer," "olefinic polymer," "olefinic interpolymer," "polyolefin" and like terms refer to a polymer derived from simple olefins. A "polyolefin" contains equal to or greater than 50 wt %, or a majority amount of, polymerized olefin monomer (based on the total weight of the polymer) and, optionally, may contain at least one comonomer. Non-limiting examples of α-olefin monomer include $C_2$, or $C_3$ to $C_4$, or $C_6$, or $C_8$, or $C_{10}$, or $C_{12}$, or $C_{16}$, or $C_{18}$, or $C_{20}$ α-olefins, such as ethylene, propylene, 1-butene, 1-hexene, 4-methyl-1-pentene, and 1-octene. Representative polyolefins include polyethylene, polypropylene, polybutene, polyisoprene, and their various interpolymers.

A "polymer" is a compound prepared by polymerizing monomers, whether of the same or a different type, that in polymerized form provide the multiple and/or repeating "units" or "mer units" that make up a polymer. "Polymer" includes homopolymers, copolymers, terpolymers, interpolymers, and so on. "Polymer" also embraces all forms of copolymer, e.g., random, block, etc. An "interpolymer" is a polymer prepared by the polymerization of at least two types of monomers or comonomers. "Interpolymer" includes, but is not limited to, copolymers (which usually refers to polymers prepared from two different types of monomers or comonomers), terpolymers (which usually refers to polymers prepared from three different types of monomers or comonomers), tetrapolymers (which usually refers to polymers prepared from four different types of monomers or comonomers), and the like. The terms "ethylene/α-olefin copolymer" and "propylene/α-olefin copolymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "polypropylene polymer," "propylene-based polymer," or "propylene polymer," is a polymer that contains equal to or greater than 50 wt %, or a majority amount of, polymerized propylene monomer (based on the total weight of the polymer) and, optionally, may contain at least one comonomer. The generic term "polypropylene" thus includes propylene homopolymer, propylene interpolymer, a blend of two or more propylene homopolymers, a blend of two or more propylene interpolymers, and a blend of one or more propylene homopolymers with one or more propylene interpolymers.

"Polystyrene" is an aromatic polymer prepared from styrene monomer as the only type of monomer. Thus, polystyrene is a styrene homopolymer. The generic term "polystyrene" includes impact modified polystyrene.

A "styrenic block copolymer" is an elastomer having at least one block segment of a styrenic monomer in combination with another block segment of another comonomer. The structure of the styrene block copolymers can be of the linear or radial type, and of the diblock or triblock type. Styrenic block copolymers are available from Dexco Polymers under the trademark VECTOR, from Kraton Corporation under the trademark KRATON, and from Dynasol under the trademark SOLPRENE.

A "thermoplastic" material is a linear or branched polymer which can be repeatedly softened and made flowable when heated and returned to a hard state when cooled to room temperature. In addition, thermoplastics can be molded or extruded into articles of any predetermined shape when heated to the softened state.

(A) Polypropylene Polymer

The present composition comprises a polypropylene polymer. In certain embodiments, the present composition comprises from 29.99 wt % to 99.99 wt % (e.g., from 30 wt % to 99.99 wt %, from 35 wt % to 90 wt %, from 40 wt % to 90 wt %, from 45 wt % to 90 wt %, from 50 wt % to 90 wt %, from 50 wt % to 85 wt %, from 55 wt % to 80 wt %, from 60 wt % to 75 wt %, from 65 wt % to 75 wt %, from 70 wt % to 75 wt %, or from 70 wt % to 71 wt %) of a polypropylene polymer, based on the total weight of the composition. Said in another way, in certain embodiments, the composition includes from 29.99 wt %, or 30 wt %, or 35 wt %, or 40 wt %, or 45 wt %, or 50 wt %, or 55 wt %, or 60 wt %, or 65 wt %, or 70 wt % to 71 wt %, or 75 wt %, or 80 wt %, or 85 wt %, or 90 wt %, or 99.99 wt % of a polypropylene polymer, based on the total weight of the composition.

In certain embodiments, the polypropylene polymer contains from greater than 50 wt %, or 60 wt %, or 70 wt %, or 75 wt % to 80 wt %, or 90 wt %, or 95 wt %, or 98 wt %, or 99 wt %, or 100 wt % polymerized propylene monomer, based on the total weight of the polymer. The remainder of the polypropylene polymer is derived from units of ethylene and/or an α-olefin having from 4, or 6 to 8, or 12, or 16, or 20 carbon atoms. In an embodiment, the α-olefin is a $C_4$-$C_{20}$ linear, branched, or cyclic α-olefin.

Nonlimiting examples of suitable polypropylene polymers include polypropylene homopolymer (such as Braskem™ Polypropylene H502-25RZ); polypropylene random copolymer (such as Braskem™ Polypropylene R751-12N); polypropylene impact copolymer (such as YUPLENE™ BX3900 available from SK Global Chemical and Braskem™ Polypropylene T702-12N); graft polypropylene copolymers; and block propylene copolymers (such as polypropylene olefin block copolymers (PP-OBC) available from The Dow Chemical Company).

In various embodiments, the polypropylene polymer is a polypropylene impact copolymer.

In various embodiments, the polypropylene polymer has a density from 0.890 to 0.920 g/cm³ (e.g., from 0.890 to 0.915 g/cm³, from 0.890 to 0.910 g/cm³, from 0.895 to 0.905 g/cm³, etc.) in accordance with ASTM D792. Said in another way, in various embodiments, the polypropylene polymer has a density from 0.890 g/cm³, or 0.895 g/cm³, or 0.900 g/cm³ to 0.905 g/cm³, or 0.910 g/cm³, or 0.915 g/cm³, or 0.920 g/cm³ in accordance with ASTM D792.

In various embodiments, the polypropylene polymer has a melt flow rate from 1 g/10 min to 200 g/10 min (e.g., from 1 g/10 min to 150 g/10 min, from 15 g/10 min to 100 g/10 min, from 30 g/10 min to 100 g/10 min, from 40 to 90 g/10 min, from 45 to 80 g/10 min, from 50 to 70 g/10 min, from 55 to 65 g/10 min, etc.) in accordance with ASTM D1238 at 230° C./2.16 kg. Said in another way, in various embodiments, the polypropylene polymer has a melt flow rate from 1 g/10 min, or 15 g/10 min, or 30 g/10 min, or 40 g/10 min, or 50 g/10 min, or 55 g/10 min, or 60 g/10 min to 65 g/10 min, or 70 g/10 min, or 80 g/10 min, or 90 g/10 min, or 100 g/10 min, or 150 g/10 min, or 200 g/10 min according to ASTM D1238 at 230° C./2.16 kg.

Polypropylene suitable for use herein can have one, some, or all of the following properties:
(a) a density from 0.890 g/cm³, or 0.895 g/cm³, or 0.900 g/cm³ to 0.905 g/cm³, or 0.910 g/cm³, or 0.915 g/cm³, or 0.920 g/cm³ in accordance with ASTM D792; and/or
(b) a melt flow rate from 50 g/10 min, or 55 g/10 min, or 60 g/10 min to 65 g/10 min, or 70 g/10 min, or 80 g/10 min, or 90 g/10 min, or 100 g/10 min in accordance with ASTM D1238 at 230° C./2.16 kg.

In one or more embodiments, the polypropylene polymer is a polypropylene impact copolymer with a density of 0.900 g/cm³ (ASTM D792) and a melt flow rate of 60 g/10 min (ASTM D1238, 230° C./2.16 kg).

The polypropylene polymer may comprise one or more embodiments disclosed herein.

(B) Elastomer Component

The present composition comprises an elastomer component. In certain embodiments, the present composition comprises from 0 wt % to 70 wt % (e.g., from 1 wt % to 65 wt %, from 1 wt % to 60 wt %, from 1 wt % to 55 wt %, from 1 wt % to 50 wt %, from 1 wt % to 45 wt %, from 1 wt % to 40 wt %, from 5 wt % to 35 wt %, from 5 wt % to 30 wt %, from 5 wt % to 25 wt %, from 10 wt % to 20 wt %, from 10 wt % to 15 wt %, from 12 wt % to 15 wt %, or from 12 wt % to 13 wt %) of an elastomer component, based on the total weight of the composition. Said in another way, in certain embodiments, the composition comprises from 0 wt %, or 1 wt %, or 5 wt %, or 10 wt %, or 12 wt % to 13 wt %, or 15 wt %, or 20 wt %, or 25 wt %, or 30 wt %, or 35 wt %, or 40 wt %, or 45 wt %, or 50 wt %, or 55 wt %, or 60 wt %, or 65 wt %, or 70 wt % of an elastomer component, based on the total weight of the composition.

The elastomer component of the present composition may be a polyolefin elastomer, a styrenic block copolymer, an elastomeric alloy, a thermoplastic polyurethane, a thermoplastic copolyester, a thermoplastic polyamide, or combinations thereof.

In certain embodiments, the elastomer component of the present composition is a polyolefin elastomer.

In certain embodiments, the polyolefin elastomer of the present composition is a polyolefin elastomer or a mixture of polyolefin elastomers. A "polyolefin elastomer" is an elastomeric polymer containing at least 50 mole percent (mol %) of units derived from one or more α-olefins (based on the total amount of polymerizable monomers), or that contains equal to or greater than 50 wt %, or a majority amount of, polymerized α-olefin monomer (based on the total weight of the elastomer). In various embodiments, the polyolefin elastomers consist of only polymerized α-olefin monomer, including ethylene. Such polyolefin elastomers can be either homopolymers or interpolymers. Examples of polyolefin homopolymers are homopolymers of ethylene or propylene. Examples of polyolefin interpolymers are ethylene/α-olefin interpolymers and propylene/α-olefin interpolymers. In such embodiments, the α-olefin can be a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Illustrative polyolefin copolymers include ethylene/propylene, ethylene/butene, ethylene/1-hexene, ethylene/1-octene, and the like. Illustrative terpolymers include ethylene/propylene/1-octene, ethylene/propylene/butene, and ethylene/butene/1-octene. In an embodiment, the polyolefin elastomer is an ethylene/octene copolymer. Additionally, the copolymers can be random or blocky.

Polyolefin elastomers can also comprise one or more functional groups such as an unsaturated ester or acid or silane, and these elastomers (polyolefins) are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids. One example of an unsaturated silane is vinyl trialkoxysilane.

Functional groups can also be included in the polyolefin elastomer through grafting which can be accomplished as is commonly known in the art. In one embodiment, grafting may occur by way of free radical functionalization which typically includes melt blending the polyolefin elastomer, a free radical initiator (such as a peroxide or the like), and a compound containing a functional group. During melt blending, the free radical initiator reacts (reactive melt blending) with the polyolefin elastomer to form polymer radicals. The compound containing a functional group bonds to the backbone of the polymer radicals to form a functionalized polymer. Exemplary compounds containing functional groups include but are not limited to alkoxysilanes (e.g., vinyl trimethoxysilane, vinyl triethoxysilane) and vinyl carboxylic acids and anhydrides (e.g., maleic anhydride).

Commercial examples of polyolefin elastomers useful herein include very-low-density polyethylene (VLDPE) (e.g., FLEXOMER™ ethylene/1-hexene polyethylene made by The Dow Chemical Company); homogeneously branched, linear ethylene/α-olefin copolymers (e.g. TAFMER™ by Mitsui Petrochemicals Company Limited and EXACT™ by Exxon Chemical Company); homogeneously branched, substantially linear ethylene/α-olefin copolymers (e.g., AFFINITY™ Polyolefin Plastomers and ENGAGE™ Polyolefin Elastomers available from The Dow Chemical Company); amorphous polyolefins (APOs) (e.g., EASTOFLEX™ amorphous propylene homopolymer available from Eastman Chemical Company); olefin block copolymers (e.g., INFUSE™ and INTUNE™ olefin block copolymers available from The Dow Chemical Company); polybutene-1 copolymers (e.g., Koattro plastomers available from Lyondellbasell); and combinations thereof. In various embodiments, the polyolefin elastomers are the homogeneously branched linear and substantially linear ethylene/α-olefin copolymers. The substantially linear ethylene copolymers are more fully described in U.S. Pat. Nos. 5,272,236; 5,278,272 and 5,986,028. In another embodiment, the polyolefin elastomers are amorphous polyolefins, such as those more fully described in US Pub. No. 2004/0081795.

The polyolefin elastomers useful herein also include propylene-, butene-, and any other alkene-based copolymers. Such copolymers may comprise a majority (i.e., greater than 50 weight percent (wt %)) of units derived from the alkene (e.g., propylene) and a minority of units derived from another α-olefin (including ethylene). In an embodiment, the polyolefin elastomer includes a propylene-based copolymer. In further embodiments, the polyolefin elastomer comprises a propylene-ethylene copolymer. Exemplary propylene-based copolymers useful herein include VERSIFY™ polymers available from The Dow Chemical Company, and VISTAMAXX™ polymers available from ExxonMobil Chemical Company. In certain embodiments, when the component (B) elastomer component includes a polypropylene, it is different than the component (A) polypropylene.

Polyolefin elastomers can also include ethylene/propylene/diene monomer (EPDM) terpolymer elastomers and chlorinated polyethylenes (CPE). Commercial examples of suitable EPDMs include NORDEL™ EPDMs, available from The Dow Chemical Company. Commercial examples of suitable CPEs include TYRIN™ CPEs, available from The Dow Chemical Company.

In one or more embodiments, the polyolefin elastomer is selected from the group consisting of ethylene-based polyolefin elastomers, propylene-based polyolefin elastomers, and combinations thereof. In such embodiments, the ethylene-based polyolefin elastomer can have an ethylene content of greater than 50 wt %, or greater than 60 wt %, based on the entire weight of the ethylene-based polyolefin elastomer, with the balance consisting of one or more alpha-olefin monomers. Additionally, the ethylene-based polyolefin elastomer can have an ethylene content ranging from greater than 50 wt %, or 60 wt % to 75 wt %, or 90 wt %, based on the entire weight of the ethylene-based polyolefin elastomer, with the balance consisting of one or more alpha-olefin monomers. In various embodiments, the alpha-olefin monomer is 1-octene.

Furthermore, when the polyolefin elastomer is propylene-based, it can have a propylene content of greater than 50 wt %, greater than 70 wt %, or greater than 90 wt %, based on the entire weight of the propylene-based polyolefin elastomer, with the balance consisting of one or more alpha-olefin monomers (including ethylene). Additionally, the propylene-based polyolefin elastomer can have a propylene content ranging from greater than 50 wt %, or 70 wt %, or 90 wt % to 97 wt %, or 98 wt %, or 99 wt %, based on the entire weight of the propylene-based polyolefin elastomer, with the balance consisting of one or more alpha-olefin monomers (including ethylene). In various embodiments, when the polyolefin elastomer is propylene-based, the alpha-olefin comonomer is ethylene. Nonlimiting examples of a suitable propylene-based polyolefin elastomer include propylene copolymer and propylene homopolymer. When the (B) elastomer component includes a polypropylene, it is different than the component (A) polypropylene.

In one or more embodiments, the polyolefin elastomer is an ethylene/1-octene copolymer.

Polyolefin elastomers suitable for use herein can have a density, in accordance with ASTM D792, from 0.850 g/cm$^3$ to 0.930 g/cm$^3$ (e.g., from 0.850 g/cm$^3$ to 0.920 g/cm$^3$, from 0.850 g/cm$^3$ to 0.910 g/cm$^3$, from 0.850 g/cm$^3$ to 0.900 g/cm$^3$, from 0.850 g/cm$^3$ to 0.890 g/cm$^3$, from 0.850 g/cm$^3$ to 0.880 g/cm$^3$, or from 0.860 g/cm$^3$ to 0.870 g/cm$^3$). Said in another way, in various embodiments, a polyolefin elastomer suitable for use herein has a density from 0.850 g/cm$^3$, or 0.860 g/cm$^3$ to 0.870 g/cm$^3$, or 0.880 g/cm$^3$, or 0.890 g/cm$^3$, or 0.900 g/cm$^3$, or 0.910 g/cm$^3$, or 0.920 g/cm$^3$, or 0.930 g/cm$^3$ in accordance with ASTM D792.

Polyolefin elastomers suitable for use herein can have a melt index from 0.1 g/10 min to 100 g/10 min (e.g., from 0.1 g/10 min to 75 g/10 min, from 0.5 g/10 min to 50 g/10 min, from 1 g/10 min to 40 g/10 min, from 1 g/10 min to 30 g/10 min, from 5 g/10 min to 20 g/10 min, from 10 g/10 min to 20 g/10 min, or from 10 g/10 min to 15 g/10 min) in accordance with ASTM D1238 at 190° C./2.16 kg). Said in another way, in certain embodiments, polyolefin elastomers suitable for use herein can have a melt index from 0.1 g/10 min, or 0.5 g/10 min, or 1 g/10 min, or 5 g/10 min, or 10 g/10 min to 15 g/10 min, or 20 g/10 min, or 30 g/10 min, or 40 g/10 min, or 50 g/10 min, or 75 g/10 min, or 100 g/10 min in accordance with ASTM D1238 at 190° C./2.16 kg.

Polyolefin elastomers suitable for use herein can have one or both of the following properties:

(a) a density from 0.850 g/cm$^3$, or 0.860 g/cm$^3$ to 0.870 g/cm$^3$, or 0.880 g/cm$^3$, or 0.890 g/cm$^3$, or 0.900 g/cm$^3$, or 0.910 g/cm$^3$, or 0.920 g/cm$^3$, or 0.930 g/cm$^3$ in accordance with ASTM D792; and/or (b) a melt index from 0.1 g/10 min, or 0.5 g/10 min, or 1 g/10 min, or 5 g/10 min, or 10 g/10 min to 15 g/10 min, or 20 g/10 min, or 30 g/10 min, or 40 g/10 min, or 50 g/10 min, or 75 g/10 min, or 100 g/10 min in accordance with ASTM D1238 at 190° C./2.16 kg.

In one or more embodiments, the polyolefin elastomer includes an ethylene/1-octene copolymer with a density of 0.864 g/cm$^3$ (ASTM D792) and a melt index of 13 g/10 min (ASTM D1238, 190° C./2.16 kg).

The polyolefin elastomer may comprise one or more embodiments disclosed herein.

(C) Additive Component

In certain embodiments, the present composition may comprise an additive component, which includes one or more optional additives. In certain embodiments, the present composition comprises from 0 wt % to 40 wt % (e.g., from 1 wt % to 40 wt %, from 1 wt % to 35 wt %, from 1 wt % to 30 wt %, from 1 wt % to 25 wt %, from 1 wt % to 20 wt %, from 5 wt % to 20 wt %, from 10 wt % to 20 wt %, from 15 wt % to 20 wt %, or from 16 wt % to 17 wt %) of an additive component, based on the total weight of the composition. Said in another way, in certain embodiments, the present composition comprises from 0 wt %, or 1 wt %, or 5 wt %, or 10 wt %, or 15 wt %, or 16 wt % to 17 wt %, or 20 wt %, or 25 wt %, or 30 wt %, or 35 wt %, or 40 wt % of an additive component, based on the total weight of the composition.

Conventional additives, which can be introduced into the composition, are exemplified by talc, antioxidants, mineral oil, pigments, processing aids, partitioning agents, slip agents, flame retardants, ultraviolet (UV) stabilizers, reinforcing filler, calcium carbonate, mica, glass fibers, whisker, anti-scratch additives, and combinations thereof.

In certain embodiments, the composition includes talc, such as JetFi™ 700, available from IMERYS. Talc may be used in amounts of from 0 wt %, or 1 wt %, or 5 wt %, or 10 wt %, or 15 wt %, or 16 wt % to 17 wt %, 18 wt %, or 20 wt %, or 25 wt %, or 30 wt %, or 35 wt %, or 40 wt %, based on the total weight of the composition.

In certain embodiments, the composition includes an antioxidant. Nonlimiting examples of suitable antioxidants include tris(2,4-ditert-butylphenyl)phosphite, pentaerythritol tetrakis[3-[3,5-di-tert-butyl-4-hydroxyphenyl]propionate], and combinations thereof, such as a blend of 50% tris(2,4-ditert-butylphenyl)phosphite and 50% pentaerythritol tetrakis[3-[3,5-di-tert-butyl-4-hydroxyphenyl]propionate]. In an embodiment, the composition contains an antioxidant such as Irgafos® 168, Irganox® 1010, Irganox® B225 or combinations thereof. In certain embodiments, the composition includes from 0 wt % to 2 wt %, or from 0.01 wt % to 1 wt %, or from 0.1 wt % to 0.5 wt %, or from 0.2 wt % to 0.3 wt % of an antioxidant, based on the total weight of the composition.

In an embodiment, the composition includes a processing aid. Nonlimiting examples of suitable processing aids include calcium stearate. Processing aids may be used in amounts of from 0 wt %, or 0.05 wt %, or 0.1 wt % to 0.5 wt %, or 1 wt %, or 2 wt %, based on the total weight of the composition.

In an embodiment, the composition includes an ultraviolet (UV) stabilizer. Nonlimiting examples of suitable ultraviolet (UV) stabilizer include hindered amine light stabilizer (HALS) such as bis(2,2,6,6-tetramethyl-4-piperidyl)sebaceate (commercially available as Tinuvin™ 770 from BASF) and poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]] (commercially available as Chimassorb™ 944 from BASF). UV stabilizers may be used in amounts of from 0.05 wt %, or 0.1 wt %, or 0.5 wt % to 1 wt %, or 2 wt %, based on the total weight of the composition.

In an embodiment, the composition includes a reinforcing filler. Nonlimiting examples of reinforcing filler include glass fiber, mica, whisker, calcium carbonate (CaCO$_3$), and combinations thereof. Reinforcing filler may be used in amounts of from 2 wt %, or 5 wt % to 10 wt %, or 15 wt %, or 20 wt %, based on the total weight of the composition.

In an embodiment, the (C) additive component comprises talc and an antioxidant.

The additive component may comprise one or more embodiments disclosed herein.

(D) Scavenger Component

The present composition comprises a scavenger component comprising a polyacetoacetate compound having the Formula (I) and an amino alcohol compound having the Formula (II). The scavenger component may be present in the composition in an amount of from 0.01 wt % to 5 wt % (e.g., from 0.01 wt % to 1 wt %, or from 0.01 wt % to 0.75 wt %, or from 0.05 wt % to 0.5 wt %, or from 0.1 wt % to 0.5 wt %, or from 0.2 wt % to 0.3 wt %) based on the total weight of the composition, wherein the weight ratio of the polyacetoacetate compound having the Formula (I) to the amino alcohol compound having the Formula (II) is from 1:20 to 20:1 (e.g., from 5:1 to 10:1) based on the total weight of the scavenger component. Said in another way, in certain embodiments, the present composition includes from 0.01 wt %, or 0.05 wt %, or 0.1 wt %, or 0.2 wt % to 0.3 wt %, or 0.5 wt %, or 0.75 wt %, or 1 wt %, or 5 wt % of a scavenger component comprising a polyacetoacetate compound having the Formula (I) and an amino alcohol compound having the Formula (II), based on the total weight of the composition, wherein the weight ratio of the polyacetoacetate compound having the Formula (I) to the amino alcohol compound having the Formula (II) is from 1:20 to 20:1 (e.g., from 5:1 to 10:1) based on the total weight of the scavenger component.

In further embodiments, the present composition comprises from 0.01 wt % to 5 wt % (e.g., from 0.01 wt % to 1 wt %, or from 0.01 wt % to 0.75 wt %, or from 0.05 wt % to 0.5 wt %, or from 0.1 wt % to 0.5 wt %, or from 0.2 wt % to 0.3 wt %) of the polyacetoacetate compound having the Formula (I), based on the total weight of the composition. In further embodiments, the present composition comprises from 0.01 wt % to 1 wt % (e.g., from 0.01 wt % to 0.75 wt %, or from 0.01 wt % to 0.5 wt %, or from 0.01 wt % to 0.1 wt %, or from 0.02 wt % to 0.08 wt %) of the amino alcohol compound having the Formula (II), based on the total weight of the composition.

As defined herein, a polyacetoacetate compound is a compound containing two or more acetoacetate (—O—C(O)CH$_2$C(O)—) groups. Suitable polyacetoacetate compounds are those of Formula (I):

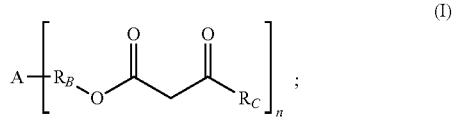

A is a polymer backbone, a $C_1$-$C_{30}$ substituted or unsubstituted linear or branched alkyl, aryl, arylalkyl, or alkaryl group wherein the substituents may be one or more O, N, S, halogen, or phosphine;

$R_B$ is a bond or a $C_1$-$C_{30}$ linear or branched alkyl, aryl, arylalkyl, or alkaryl group;

$R_C$ is a substituted or unsubstituted $C_1$-$C_6$ alkyl or a substituted or unsubstituted aryl group; and n is a number from 2 to 100.

In certain embodiments, $R_B$ is a $C_1$ alkyl group or a substituted or unsubstituted ether moiety. In certain embodiments, RC is a $C_1$ or $C_2$ alkyl group. In certain embodiments, n is a number from 2 to 20, 2 to 10, or 2 to 4.

Suitable polyacetoacetates according to the present disclosure are 2-ethyl-2-(((3-oxobutanoyl)oxy)methyl)propane-1,3-diyl bis(3-oxobutanoate) (i.e., trimethylolpropane triacetoacetate or "AATMP") and its isomers, 2,2-bis(((3-oxobutanoyl)oxy)methyl)propane-1,3-diyl bis(3-oxobutanoate) and its isomers, 2-(((3-oxobutanoyl)oxy)methyl) propane-1,3-diyl bis(3-oxobutanoate) and its isomers, 2-methyl-2-(((3-oxobutanoyl)oxy)methyl)propane-1,3-diyl bis(3-oxobutanoate) and its isomers, 1,2-diethylol diacetoacetate and its isomers, any homologs of acetoacetated polypropylene glycol or polyethylene glycol wherein the acetoacetated polypropylene glycol or polyethylene glycol can be linear or branched, acetoacetated branched polyether polyol or polyester polyol, hexane-1,2,3,4,5,6-hexayl hexakis(3-oxobutanoate) and its isomers, propane-1,2,3-triyl tris (3-oxobutanoate) and its isomers, or mixtures thereof.

Preferable polyacetoacetate compounds include, but are not limited, to the following:

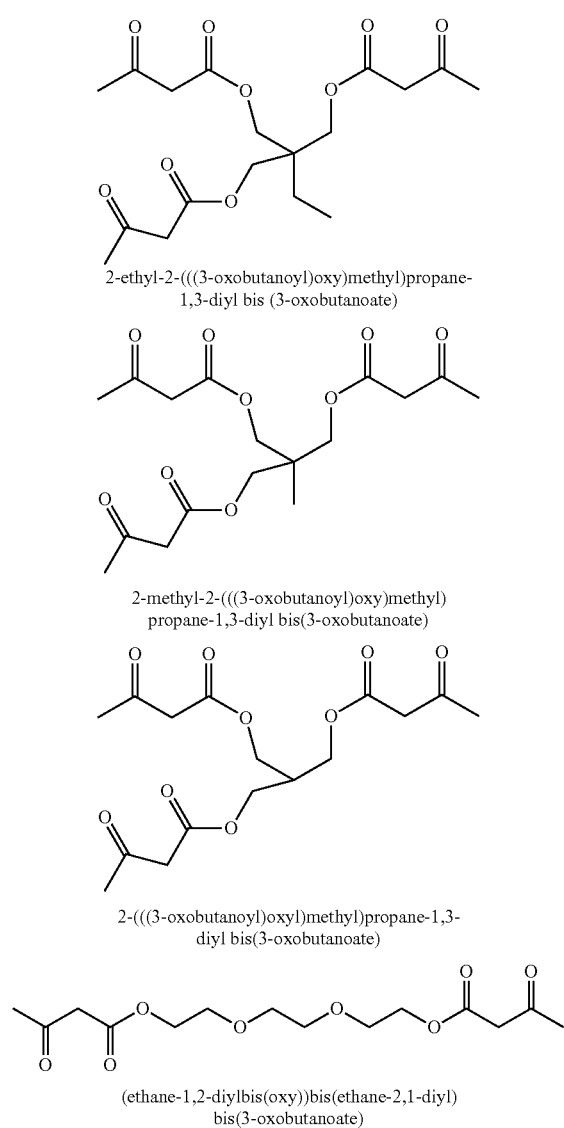
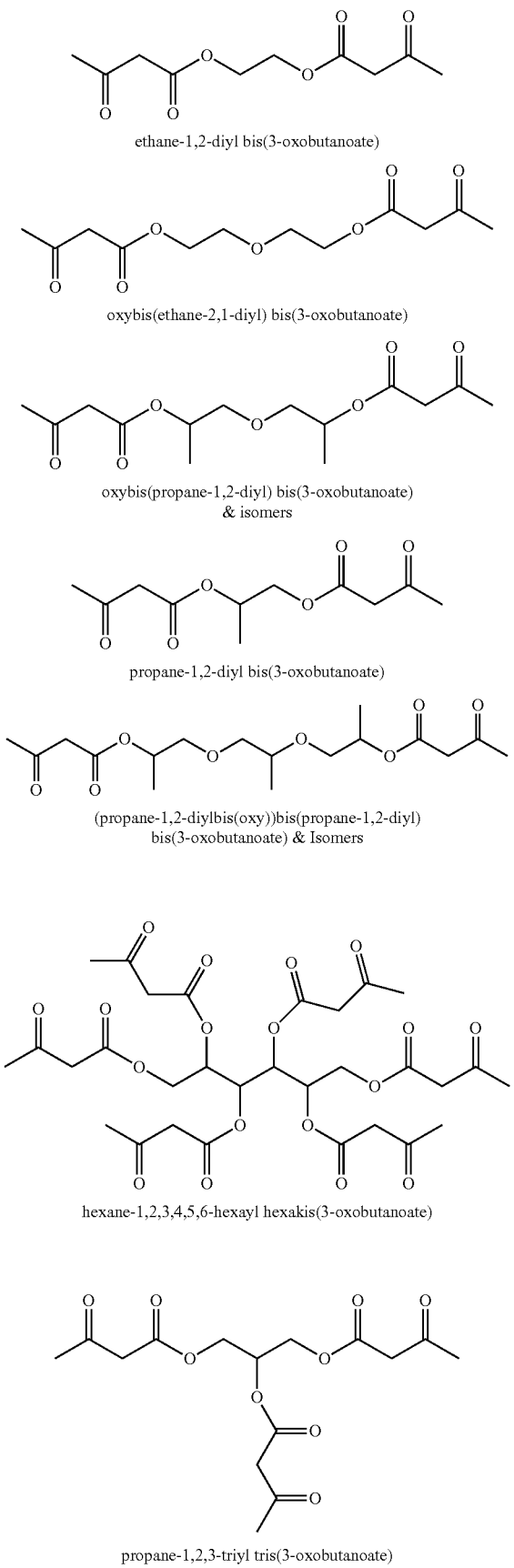

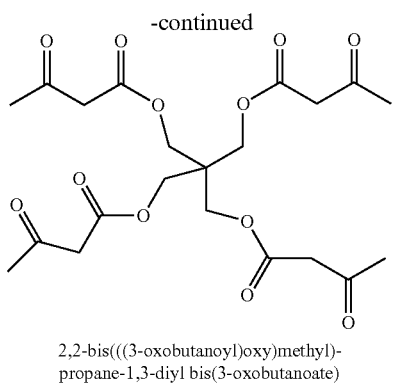

2,2-bis(((3-oxobutanoyl)oxy)methyl)-
propane-1,3-diyl bis(3-oxobutanoate)

In certain embodiments, the polyacetoacetate compound having the Formula (I) of the (D) scavenger component of the present composition is 2-ethyl-2-(((3-oxobutanoyl)oxy)methyl)propane-1,3-diyl bis(3-oxobutanoate) (i.e., trimethylolpropane triacetoacetate or "AATMP").

The polyacetoacetate compound having the Formula (I) may comprise one or more embodiments disclosed herein.

The (D) scavenger component of the present composition further comprises an amino alcohol compound having the Formula (II) (embodiment 1 of the amino alcohol compound):

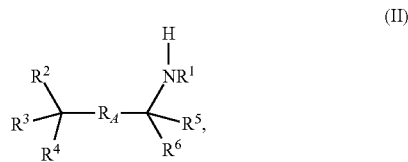

or a salt thereof, wherein:
$R_A$ is a bond or is $C(R^7R^8)$;
$R^1$ is H, OH or a $C_1$-$C_6$ alkyl group;
$R^2$ is H, OH or a $C_1$-$C_6$ alkyl group;
$R^3$, $R^4$, $R^5$, and $R^6$ are independently H or a $C_1$-$C_6$ alkyl group;
$R^7$ and $R^8$ are independently H, OH or a $C_1$-$C_6$ alkyl group;
wherein the $C_1$-$C_6$ alkyl group in $R^1$ to $R^8$ is optionally independently substituted with OH, $NR^9R^{10}$, a $C_1$-$C_6$ alkyl group, or a phenyl group, wherein $R^9$ and $R^{10}$ are independently H or a $C_1$-$C_6$ alkyl group, and
provided that if neither $R^7$ nor $R^8$ is OH, then at least one of $R^1$ and $R^2$ is OH.

In an exemplary embodiment, $R^1$ is H (embodiment 2 of the amino alcohol compound). Further exemplary embodiments are described below.

In either embodiment 1 or embodiment 2 of the amino alcohol compound, $R_A$ is a bond and $R^2$ is OH (embodiment 3 of the amino alcohol compound).

In embodiments 1-3 of the amino alcohol compound, $R^1$, $R^3$, and $R^4$ are each H, $R^5$ is H or optionally substituted $C_1$-$C_6$ alkyl, and $R^6$ is optionally substituted $C_1$-$C_6$ alkyl, preferably $C_1$-$C_3$ alkyl, more preferably methyl.

In embodiments 1-3 of the amino alcohol compound, $R^1$, $R^3$, and $R^4$ are each H and $R^5$ and $R^6$ are independently optionally substituted $C_1$-$C_6$ alkyl, more preferably one of $R^5$ and $R^6$ is unsubstituted and the other is substituted with OH.

In embodiments 1-3 of the amino alcohol compound, $R^1$, $R^3$, and $R^4$ are each H and $R^5$ and $R^6$ are independently optionally substituted $C_1$-$C_6$ alkyl, more preferably both of $R^5$ and $R^6$ are substituted with OH.

In embodiment 1, $R^1$ is OH (embodiment 4 of the amino alcohol compound). More preferably within this embodiment, $R_A$ is a bond and $R^2$, $R^3$, $R^4$, and $R^5$ are each H, and $R^6$ is optionally substituted $C_1$-$C_6$ alkyl, preferably unsubstituted $C_1$-$C_3$ alkyl, more preferably methyl.

Exemplary amino alcohol compounds having the Formula (II) include but are not limited to: 2-amino-1-butanol, 2-amino-2-ethyl-1,3-propanediol, 2-amino-2-methyl-1-propanol, 2-amino-1-methyl-1,3-propanediol, 2-amino-2(hydroxymethyl)propane-1,3-diol or tris (hydroxymethyl) aminomethane, N-isopropylhydroxylamine, ethanolamine, diethanolamine, N-methylethanolamine, N-butylethanolamine, monoisopropanolamine, diisopropanolamine, mono-sec-butanolamine, di-sec-butanolamine, and salts thereof.

Suitable amino alcohol compounds having the Formula (II) are available from a variety of commercial sources, including ANGUS Chemical Company (Buffalo Grove, Ill., USA), The Dow Chemical Company (Midland, Mich., USA), or can be readily prepared by techniques well known in the art. The Formula (II) compounds can be used in the form of salts. Suitable salts include hydrochloride, acetate, formate, oxalate, citrate, carbonate, sulfate, and phosphate.

In certain embodiments, the amino alcohol compound having the Formula (II) is 2-amino-2(hydroxymethyl)propane-1,3-diol (tris amino).

The amino alcohol compound having the Formula (II) may comprise one or more embodiments disclosed herein.

(E) Compatibilizer

In certain embodiments, the present composition may optionally include a compatibilizer. In certain embodiments, the present composition comprises from 0 wt % to 10 wt % of a compatibilizer, based on the total weight of the composition. In certain embodiments, the present composition comprises from 0 wt %, or 0.01 wt %, or 0.05 wt %, or 0.1 wt %, or 0.2 wt %, or 0.3 wt %, or 0.4 wt %, or 0.5 wt %, or 0.6 wt % to 0.8 wt %, or 1.0 wt %, or 1.5 wt %, or 2.0 wt %, or 3.0 wt %, or 4.0 wt %, or 5.0 wt %, or 8.0 wt %, or 10 wt % of the compatibilizer, based on the total weight of the composition.

The compatibilizer may be a styrenic block copolymer, an ethylene acrylic acid (EAA) copolymer, an ethylene ethyl acrylate (EEA) copolymer, a block composite, a specified block composite, a crystalline block composite, an ethylene/vinyl acetate (EVA) copolymer, an ethylene-carboxylic acid copolymer, an ionomer, an ethylene methacrylic acid copolymer or an ethylene isobutyl acrylate copolymer, terpolymers of acrylates and acids, or an ethylene dipolymer E/A, wherein E is ethylene; A is acrylic or methacrylic acid, or an ethylene terpolymer E/A/B, wherein E is ethylene; A is acrylic or methacrylic acid; and B is n-butyl or isobutyl acrylate, or an ethylene terpolymer E/X/Y, wherein E is ethylene; X is vinyl acetate or a $C_1$-$C_8$ alkyl acrylate; and Y is CO or $SO_2$, or combinations thereof, or salts thereof, or neutralized versions thereof. In various embodiments, the compatibilizer could also be an ethylene dipolymer E/A or an ethylene terpolymer E/A/B, wherein E is ethylene; A is acrylic or methacrylic acid; and B is n-butyl or isobutyl acrylate; the weight proportion of monomer A in both the dipolymer and the terpolymer being about 2-20%, and the weight proportion of monomer B in the 20 terpolymer being at most about 23%; the carboxylic acid groups in either type of polymer being either unneutralized or neutralized to an extent of at most about 71% with metal ions having a valency of from 1 to 3. Both E/A dipolymers and E/A/B terpolymers are well known and commercially available; some, for example, from E. I. du Pont de Nemours and Company and ethylene/acrylic acid copolymer from Dow Chemical Co. Neutralized di- and terpolymers also are available, i.a., from E. I. du Pont de Nemours and Company. An exemplary amount of acrylic or methacrylic acid in a dipolymer or terpolymer is 8-15 weight percent. A further exemplary amount of a polymer of this group is about 75-90 parts. When the carboxylic acid groups are neutralized, the neutralizing metal ions are preferably sodium, zinc, magnesium, or aluminum, but may also be other metals from the first three groups of the Periodic Chart of the Elements.

In various embodiments, the compatibilizer could also be a an ethylene terpolymer E/X/Y, where E is ethylene; X is vinyl acetate or a $C_1$-$C_8$ alkyl acrylate; and Y is CO or $SO_2$; the weight proportions of X and Y being as follows: Y about 1-15%; X, when it is vinyl acetate, about 15-30%, and when it is an alkyl acrylate, about 10-55%. The E/X/Y terpolymers are commercially available, while others can be made according to known processes. For example, E/VA/CO terpolymers, when VA is vinyl acetate, are available under the name ElvaloyD from E. I. du Pont de Nemours and Company. The carbon monoxide content in those terpolymers in which X is vinyl acetate should preferably be no higher than about 7% by weight; otherwise, polymer compatibility may be adversely affected. Terpolymers in which Y is SO2 are described in U.S. Pat. No. 3,684,778 to Hammer, and terpolymers in which X is an alkyl acrylate are described in U.S. Pat. No. 2,495,286 to Brubaker. The preferred terpolymer in which X is an alkyl acrylate is an ethylene/n-butyl acrylate/CO terpolymer, which can be made according to the general method taught by Brubaker. The weight proportion of n-butyl acrylate in the terpolymer is about 15-35%. Other typical alkyl acrylates and their weight proportions in the terpolymer include the following: methyl acrylate (15-55%), ethyl acrylate (15-40%), and t-butyl acrylate (10-25%). The preferred amount of E/X/Y terpolymer in the composition is 10-30 parts. Other alkyl acrylates include, among others, propyl, isopropyl, pentyl, hexyl, heptyl, octyl, and isooctyl acrylates.

Suitable compatibilizers may include, but are not limited to those disclosed in EP134501A1, which is incorporated herein by reference.

In various embodiments, the compatibilizer is a styrenic block copolymer. The styrenic block copolymer may be any styrenic block copolymer disclosed herein. In an embodiment, the styrenic block copolymer is SEBS.

Styrenic block copolymer suitable for use herein can have, in accordance with D792, a density from 0.850 g/cm$^3$, or 0.860 g/cm$^3$, or 0.870 g/cm$^3$, or 0.880 g/cm$^3$ to 0.885 g/cm$^3$, or 0.890 g/cm$^3$, or 0.900 g/cm$^3$.

Styrenic block copolymer suitable for use herein can have, in accordance with D1238 (230° C./5.00 kg), a melt flow rate from 5 g/10 min, or 10 g/10 min, or 15 g/10 min, or 20 g/10 min to 25 g/10 min, or 30 g/10 min, or 40 g/10 min, or 50 g/10 min.

Styrenic block copolymer suitable for use herein can have one or both of the following properties:
  (a) a density from 0.850 g/cm$^3$, or 0.860 g/cm$^3$, or 0.870 g/cm$^3$, or 0.880 g/cm$^3$ to 0.885 g/cm$^3$, or 0.890 g/cm$^3$, or 0.900 g/cm$^3$; and/or
  (b) a melt flow rate from 5 g/10 min, or 10 g/10 min, or 15 g/10 min, or 20 g/10 min to 25 g/10 min, or 30 g/10 min, or 40 g/10 min, or 50 g/10 min (230° C./5.00 kg).

In one or more embodiments, the compatibilizer is a styrenic block copolymer that is SEBS having a density of 0.880 g/cm$^3$ and a melt flow rate of 22 g/10 min (230° C./5.00 kg).

In various embodiments, the compatibilizer is an ethylene acrylic acid (EAA) copolymer. The EEA copolymer may contain from 1 wt %, or 5 wt %, or 10 wt %, or 12 wt %, or 15 wt %, or 18 wt % to 19 wt %, or 20 wt %, or 25 wt %, or 30 wt %, or 40 wt %, or less than 50 wt % polymerized ethyl acrylate, based on the total weight of the EEA copolymer. EEA copolymer suitable for use herein can have, in accordance with ASTM D792, a density from 0.920 g/cm$^3$, or 0.925 g/cm$^3$, or 0.930 g/cm$^3$ to 0.935 g/cm$^3$, or 0.940 g/cm$^3$, or 0.945 g/cm$^3$. EEA copolymer suitable for use herein can have, in accordance with ASTM D1238 (190° C./2.16 kg), a melt index from 0.5 g/10 min, or 1 g/10 min, or 2 g/10 min, or 5 g/10 min to 6 g/10 min, or 8 g/10 min, or 10 g/10 min, or 15 g/10 min, or 20 g/10 min.

In one or more embodiments, the compatibilizer is an EEA copolymer containing 18.5 wt % polymerized ethyl acrylate, based on the total weight of the EEA copolymer, that has a density of 0.931 g/cm$^3$ (ASTM D792) and a melt index of 6.0 g/10 min (ASTM D1238, 190° C./2.16 kg).

In an embodiment, the compatibilizer is a block composite. "Block composite" refers to polymers comprising an ethylene based polymer (EP) (soft copolymer) having an ethylene content of from 10 mol % to 90 mol %, an alpha-olefin based polymer (AOP) (hard copolymer) having an alpha-olefin content of greater than 90 mol %, and a block copolymer (diblock) having an ethylene block/segment (EB) and an alpha-olefin block/segment (AOB), wherein the ethylene block of the block copolymer is the same composition as the ethylene based polymer of the block composite and the alpha-olefin block of the block copolymer is the same composition as the alpha-olefin based polymer of the block composite. The compositional split between the amount of ethylene based polymer and alpha-olefin based polymer will be essentially the same as that between the corresponding blocks in the block copolymer. The block composite of the present disclosure is similar to those disclosed in U.S. Pat. Nos. 8,053,529; 8,686,087; and 8,716,400, which are incorporated herein by reference.

In an embodiment, the compatibilizer is a specified block composite. "Specified block composite" refers to polymers comprising an ethylene based polymer (EP) (soft copolymer) having an ethylene content of from 78 mol % to 90 mol %, an alpha-olefin based polymer (AOP) (hard copolymer) having an alpha-olefin content of from 61 mol % to 90 mol %, and a block copolymer (diblock) having an ethylene block/segment (EB) and an alpha-olefin block/segment (AOB), wherein the ethylene block of the block copolymer is the same composition as the ethylene based polymer of the specified block composite and the alpha-olefin block of the block copolymer is the same composition as the alpha-olefin based polymer of the specified block composite. The compositional split between the amount of ethylene based polymer and alpha-olefin based polymer will be essentially the same as that between the corresponding blocks in the block copolymer. The specified block composite of the present disclosure is similar to those disclosed in WO 2017/044547, which is incorporated herein by reference.

In an embodiment, the compatibilizer is a crystalline block composite. "Crystalline block composite" refers to polymers comprising a crystalline ethylene based polymer (CEP) having an ethylene content of greater than 90 mol %, a crystalline alpha-olefin based polymer (CAOP) having an alpha-olefin content of greater than 90 mol %, and a block copolymer (diblock) having a crystalline ethylene block (CEB) and a crystalline alpha-olefin block (CAOB), wherein the CEB of the block copolymer is the same composition as the CEP of the crystalline block composite and the CAOB of the block copolymer is the same composition as the CAOP of the crystalline block composite. The compositional split between the amount of CEP and CAOP will be essentially the same as that between the corresponding blocks in the block copolymer. The crystalline block composite of the present disclosure is similar to those disclosed in WO 2016/0028961 A1, which is incorporated herein by reference.

The compatibilizer may comprise one or more embodiments disclosed herein.

Composition

In certain embodiments, the present composition includes:

(A) from 29.99 wt %, or 30 wt %, or 35 wt %, or 40 wt %, or 45 wt %, or 50 wt %, or 55 wt %, or 60 wt %, or 65 wt %, or 70 wt % to 71 wt %, or 75 wt %, or 80 wt %, or 85 wt %, or 90 wt %, or 99.99 wt % of a polypropylene impact copolymer;

(B) from 0 wt %, or 1 wt %, or 5 wt %, or 10 wt %, or 12 wt % to 13 wt %, or 15 wt %, or 20 wt %, or 25 wt %, or 30 wt %, or 35 wt %, or 40 wt %, or 45 wt %, or 50 wt %, or 55 wt %, or 60 wt %, or 65 wt %, or 70 wt % of an ethylene/1-octene copolymer;

(C) from 0 wt %, or 1 wt %, or 5 wt %, or 10 wt %, or 15 wt %, or 16 wt % to 17 wt %, or 20 wt %, or 25 wt %, or 30 wt %, or 35 wt %, or 40 wt % of an additive component comprising talc and an antioxidant;

(D) from 0.01 wt %, or 0.05 wt %, or 0.1 wt %, or 0.2 wt % to 0.3 wt %, or 0.5 wt %, or 0.75 wt %, or 1 wt %, or 5 wt % of a scavenger component comprising AATMP and tris amino, wherein the ratio of AATMP to tris amino is from 5:1 to 10:1; and (E) from 0 wt %, or 0.01 wt %, or 0.05 wt %, or 0.1 wt %, or 0.2 wt %, or 0.3 wt %, or 0.4 wt %, or 0.5 wt %, or 0.6 wt % to 0.8 wt %, or 1 wt %, or 1.5 wt %, or 2 wt %, or 2.5 wt %, or 3 wt %, or 3.5 wt %, or 4 wt %, or 5 wt %, or 8 wt %, or 10 wt % of a compatibilizer.

It is understood that the sum of the components in each of the foregoing compositions yields 100 weight percent.

The present composition advantageously causes aldehyde abatement (i.e., reduction) or scavenges aldehydes. Aldehydes can be dangerous to the health of humans and/or animals. Aldehydes can also be harmful to the environment. In addition, it is well known that aldehydes and ketones can contribute significantly to the generation of odor. Nonlimiting examples of aldehydes include formaldehyde, acetaldehyde, acrolein, propionaldehyde, and crotonaldehyde.

Beyond this, the present composition surprisingly reduces (or prevents the increase of) odor while surprisingly maintaining good mechanical properties.

In certain embodiments, the present composition contains from 0 mg/m$^3$ to less than or equal to 0.05 mg/m$^3$, or less than or equal to 0.03 mg/m$^3$, or less than or equal to 0.01 mg/m$^3$, or less than or equal to 0.005 mg/m$^3$, or less than or equal to 0.001 mg/m$^3$ formaldehyde, as measured in accordance with the VOC Test Method described below.

In certain embodiments, the present composition contains from 0 mg/m$^3$ to less than or equal to 1 mg/m$^3$, or less than or equal to 0.5 mg/m$^3$, or less than or equal to 0.1 mg/m$^3$, or less than or equal to 0.05 mg/m$^3$, or less than or equal to 0.03 mg/m$^3$, or less than or equal to 0.01 mg/m$^3$, or less than or equal to 0.005 mg/m$^3$, or less than or equal to 0.001 mg/m$^3$ acetaldehyde, as measured in accordance with the VOC Test Method.

In certain embodiments, the present composition contains from 0 mg/m$^3$ to less than or equal to 0.05 mg/m$^3$, or less than or equal to 0.03 mg/m$^3$, or less than or equal to 0.01 mg/m$^3$, or less than or equal to 0.005 mg/m$^3$, or less than or equal to 0.001 mg/m$^3$ acrolein, as measured in accordance with the VOC Test Method described below.

In certain embodiments, the present composition contains from 0 mg/m$^3$ to less than or equal to 0.05 mg/m$^3$, or less than or equal to 0.03 mg/m$^3$, or less than or equal to 0.01 mg/m$^3$, or less than or equal to 0.005 mg/m$^3$, or less than or equal to 0.001 mg/m$^3$ propionaldehyde, as measured in accordance with the VOC Test Method described below.

In certain embodiments, the present composition contains from 0 mg/m$^3$ to less than or equal to 0.05 mg/m$^3$, or less than or equal to 0.03 mg/m$^3$, or less than or equal to 0.01 mg/m$^3$, or less than or equal to 0.005 mg/m$^3$, or less than or equal to 0.001 mg/m$^3$ crotonaldehyde, as measured in accordance with the VOC Test Method described below.

In certain embodiments, the present composition has a tensile modulus from 1000 MPa, or 1200 MPa, or 1500 MPa, or 1700 MPa to 1800 MPa, or 1900 MPa, or 2000 MPa, as measured in accordance with ISO 527. In certain embodiments, the present composition has a tensile modulus from greater than 1770 MPa to less than 2000 Mpa, or less than 1900 MPa, or less than 1800 MPa, as measured in accordance with ISO 527. In certain embodiments, the present composition has a tensile modulus of greater than or equal to 1779 MPa, as measured in accordance with ISO 527. In certain embodiments, the present composition exhibits less than a 10% difference (or less than a 5% difference, or less than a 3% difference, or less than a 2% difference) with respect to a tensile modulus in MPa, as measured by ISO 527, compared to a composition without the (D) scavenger component.

In certain embodiments, the present composition has a tensile yield strength from 10 MPa, or 15 MPa, or 20 MPa, or 22 MPa to 25 MPa, or 30 MPa, or 35 MPa, as measured in accordance with ISO 527. In certain embodiments, the present composition has a tensile yield strength of greater than or equal to 22 MPa, as measured in accordance with ISO 527. In certain embodiments, the present composition has a tensile yield strength from greater than or equal to 22 MPa to less than 30 MPa, or less than 25 MPa, as measured in accordance with ISO 527. In certain embodiments, the present composition exhibits less than a 10% difference (or less than a 5% difference, or less than a 3% difference, or less than a 2% difference, or less than 1% difference) with respect to a tensile yield strength in MPa, as measured by ISO 527, compared to a composition without the (D) scavenger component.

In certain embodiments, the present composition has a flexural modulus (Young's modulus) from 1000 MPa, or 1100 MPa, or 1200 MPa, or 1300 MPa, or 1500 MPa, or 1700 MPa, or 1800 MPa to 1900 MPa, or 2000 MPa, as measured in accordance with ASTM D790. In certain embodiments, the present composition has a flexural modulus (Young's modulus) of greater than or equal to 1830 MPa, as measured in accordance with ASTM D790. In certain embodiments, the present composition has a flexural modulus (Young's modulus) from greater than 1800 MPa to less than 2000 MPa, or less than 1900 MPa, as measured in accordance with ASTM D790. In certain embodiments, the present composition exhibits less than a 10% difference (or less than a 5% difference, or less than a 3% difference, or less than a 2% difference, or less than 1% difference) with respect to a flexural modulus (Young's modulus) in MPa, as measured by ASTM D790, compared to a composition without the (D) scavenger component.

In certain embodiments, the present composition has a flexural yield strength from 20 MPa, or 25 MPa, or 30 MPa, or 34 MPa to 35 MPa, or 40 MPa, or 45 MPa, or 50 MPa, as measured in accordance with ASTM D790. In certain embodiments, the present composition has a flexural yield strength of greater than or equal to 34 MPa, as measured in accordance with ASTM D790. In certain embodiments, the present composition has a flexural yield strength from greater than or equal to 34 MPa to less than 40 MPa, as measured in accordance with ASTM D790. In certain embodiments, the present composition exhibits less than a 10% difference (or less than a 5% difference, or less than a 3% difference, or less than a 2% difference) with respect to a flexural yield strength in MPa, as measured by ASTM D790, compared to a composition without the (D) scavenger component.

In certain embodiments, the present composition has an impact strength (Notched IZOD) at 23° C. from 1 kJ/m$^2$, or 5 kJ/m$^2$, or 8 kJ/m$^2$ to 10 kJ/m$^2$, or 15 kJ/m$^2$, or 20 kJ/m$^2$, or 25 kJ/m$^2$, or 30 kJ/m$^2$, as measured in accordance with ISO 180. In certain embodiments, the present composition has an impact strength (Notched IZOD) at 23° C. of greater than or equal to 8.5 kJ/m$^2$, as measured in accordance with ISO 180. In certain embodiments, the present composition has an impact strength (Notched IZOD) at 23° C. from greater than or equal to 8.5 kJ/m$^2$ to less than 10 kJ/m$^2$ as measured in accordance with ISO 180. In certain embodiments, the present composition exhibits less than a 10% difference (or less than a 5% difference) with respect to a an Izod impact strength (Notched IZOD) at 23° C. in kJ/m$^2$, as measured by ISO 180, compared to a composition without the (D) scavenger component.

In certain embodiments, the present composition has an impact strength (Notched IZOD) at −30° C. from 1 kJ/m$^2$, or 2 kJ/m$^2$, or 3 kJ/m$^2$ to 4 kJ/m$^2$, or 5 kJ/m$^2$, or 7 kJ/m$^2$, or 8 kJ/m$^2$, or 10 kJ/m$^2$, as measured in accordance with ISO 180. In certain embodiments, the present composition has an impact strength (Notched IZOD) at −30° C. of greater than or equal to 3.88 kJ/m$^2$, as measured in accordance with ISO 180. In certain embodiments, the present composition has an impact strength (Notched IZOD) at 23° C. from greater than or equal to 3.88 kJ/m$^2$ to less than 10 kJ/m$^2$, or less than 7 kJ/m$^2$, or less than 6 kJ/m$^2$, or less than 5 kJ/m$^2$ as measured in accordance with ISO 180. In certain embodiments, the present composition exhibits less than a 10% difference (or less than an 8% difference) with respect to an Izod impact strength (Notched IZOD) at −30° C. in kJ/m$^2$, as measured by ISO 180, compared to a composition without the (D) scavenger component.

In certain embodiments, the present composition has an odor grade of less than or equal to 5.1, in accordance with the odor grade test described below. In further embodiments, the present composition has an odor grade of less than or equal to 4.4, in accordance with the odor grade test described below. In certain embodiments, the present composition has no greater than a +0.2 difference in odor grade compared to a composition without the (D) scavenger component, in accordance with the odor grade test described below. In certain embodiments, the present composition has a lower odor grade, in accordance with the odor grade test described below, compared to a composition without the (D) scavenger component. Accordingly, in certain embodiments, the present composition has less odor compared to a composition without the (D) scavenger component. Indeed, in certain embodiments, the odor of a composition is reduced with addition, to the composition, of the (D) scavenger component comprising a polyacetoacetate compound having the Formula (I) and an amino alcohol compound having the Formula (II).

Article

In certain embodiments, the present disclosure provides an article made from a thermoplastic polyolefin composition comprising:
(A) from 29.99 wt %, or 30 wt %, or 35 wt %, or 40 wt %, or 45 wt %, or 50 wt %, or 55 wt %, or 60 wt %, or 65 wt %, or 70 wt % to 71 wt %, or 75 wt %, or 80 wt %, or 85 wt %, or 90 wt %, or 99.99 wt % of a polypropylene impact copolymer;
(B) from 0 wt %, or 1 wt %, or 5 wt %, or 10 wt %, or 12 wt % to 13 wt %, or 15 wt %, or 20 wt %, or 25 wt %, or 30 wt %, or 35 wt %, or 40 wt %, or 45 wt %, or 50 wt %, or 55 wt %, or 60 wt %, or 65 wt %, or 70 wt % of an ethylene/1-octene copolymer;
(C) from 0 wt %, or 1 wt %, or 5 wt %, or 10 wt %, or 15 wt %, or 16 wt % to 17 wt %, or 20 wt %, or 25 wt %, or 30 wt %, or 35 wt %, or 40 wt % of an additive component comprising talc and an antioxidant;
(D) from 0.01 wt %, or 0.05 wt %, or 0.1 wt %, or 0.2 wt % to 0.3 wt %, or 0.5 wt %, or 0.75 wt %, or 1 wt %, or 5 wt % of a scavenger component comprising AATMP and tris amino, wherein the ratio of AATMP to tris amino is from 5:1 to 10:1; and
(E) from 0 wt %, or 0.01 wt %, or 0.05 wt %, or 0.1 wt %, or 0.2 wt %, or 0.3 wt %, or 0.4 wt %, or 0.5 wt %, or 0.6 wt % to 0.8 wt %, or 1.0 wt %, or 1.5 wt %, or 2.0 wt %, or 2.5 wt %, or 3.0 wt %, or 3.5 wt %, or 4.0 wt %, or 5.0 wt %, or 8.0 wt %, or 10 wt % of a compatibilizer.

In various embodiments, the article is a molded article. The article may be formed by injection molding or compression molding.

The article may be in, but is not limited to, the form of an automobile interior part, such as an instrument panel, a door panel, or a seat.

In certain embodiments, the article made from the present composition contains from 0 mg/m$^3$ to less than or equal to 0.05 mg/m$^3$, or less than or equal to 0.03 mg/m$^3$, or less than or equal to 0.01 mg/m$^3$, or less than or equal to 0.005 mg/m$^3$, or less than or equal to 0.001 mg/m$^3$ formaldehyde, as measured in accordance with the VOC Test Method described below.

In certain embodiments, the article made from the present composition contains from 0 mg/m$^3$ to less than or equal to 1 mg/m$^3$, or less than or equal to 0.5 mg/m$^3$, or less than or equal to 0.1 mg/m$^3$, or less than or equal to 0.05 mg/m$^3$, or less than or equal to 0.03 mg/m$^3$, or less than or equal to 0.01 mg/m$^3$, or less than or equal to 0.005 mg/m$^3$, or less than or equal to 0.001 mg/m$^3$ acetaldehyde, as measured in accordance with the VOC Test Method.

In certain embodiments, the article made from the present composition contains from 0 mg/m$^3$ to less than or equal to 0.05 mg/m$^3$, or less than or equal to 0.03 mg/m$^3$, or less than or equal to 0.01 mg/m$^3$, or less than or equal to 0.005 mg/m$^3$, or less than or equal to 0.001 mg/m$^3$ acrolein, as measured in accordance with the VOC Test Method described below.

In certain embodiments, the article made from the present composition contains from 0 mg/m$^3$ to less than or equal to 0.05 mg/m$^3$, or less than or equal to 0.03 mg/m$^3$, or less than or equal to 0.01 mg/m$^3$, or less than or equal to 0.005 mg/m$^3$, or less than or equal to 0.001 mg/m$^3$ propionaldehyde, as measured in accordance with the VOC Test Method described below.

In certain embodiments, the article made from the present composition contains from 0 mg/m$^3$ to less than or equal to 0.05 mg/m$^3$, or less than or equal to 0.03 mg/m$^3$, or less than or equal to 0.01 mg/m$^3$, or less than or equal to 0.005 mg/m$^3$, or less than or equal to 0.001 mg/m$^3$ crotonaldehyde, as measured in accordance with the VOC Test Method described below.

In certain embodiments, the article made from the present composition has a tensile modulus from 1000 MPa, or 1200 MPa, or 1500 MPa, or 1700 MPa to 1800 MPa, or 1900 MPa, or 2000 MPa, as measured in accordance with ISO 527. In certain embodiments, the article made from the present composition has a tensile modulus from greater than 1770 MPa to less than 2000 Mpa, or less than 1900 MPa, or less than 1800 MPa, as measured in accordance with ISO 527. In certain embodiments, the article made from the present composition has a tensile modulus of greater than or equal to 1779 MPa, as measured in accordance with ISO 527. In certain embodiments, the article made from the present composition exhibits less than a 10% difference (or less than a 5% difference, or less than a 3% difference, or less than a 2% difference) with respect to a tensile modulus in MPa, as measured by ISO 527, compared to an article made from a composition without the (D) scavenger component.

In certain embodiments, the article made from the present composition has a tensile yield strength from 10 MPa, or 15 MPa, or 20 MPa, or 22 MPa to 25 MPa, or 30 MPa, or 35 MPa, as measured in accordance with ISO 527. In certain embodiments, the article made from the present composition has a tensile yield strength of greater than or equal to 22 MPa, as measured in accordance with ISO 527. In certain embodiments, the article made from the present composition has a tensile yield strength from greater than or equal to 22 MPa to less than 30 MPa, or less than 25 MPa, as measured in accordance with ISO 527. In certain embodiments, the article made from the present composition exhibits less than a 10% difference (or less than a 5% difference, or less than a 3% difference, or less than a 2% difference, or less than 1% difference) with respect to a tensile yield strength in MPa, as measured by ISO 527, compared to an article made from a composition without the (D) scavenger component.

In certain embodiments, the article made from the present composition has a flexural modulus (Young's modulus) from 1000 MPa, or 1100 MPa, or 1200 MPa, or 1300 MPa, or 1500 MPa, or 1700 MPa, or 1800 MPa to 1900 MPa, or 2000 MPa, as measured in accordance with ASTM D790. In certain embodiments, the article made from the present composition has a flexural modulus (Young's modulus) of greater than or equal to 1830 MPa, as measured in accordance with ASTM D790. In certain embodiments, the article made from the present composition has a flexural modulus (Young's modulus) from greater than 1800 MPa to less than 2000 MPa, or less than 1900 MPa, as measured in accordance with ASTM D790. In certain embodiments, the article made from the present composition exhibits less than a 10% difference (or less than a 5% difference, or less than a 3% difference, or less than a 2% difference, or less than 1% difference) with respect to a flexural modulus (Young's modulus) in MPa, as measured by ASTM D790, compared to an article made from a composition without the (D) scavenger component.

In certain embodiments, the article made from the present composition has a flexural yield strength from 20 MPa, or 25 MPa, or 30 MPa, or 34 MPa to 35 MPa, or 40 MPa, or 45 MPa, or 50 MPa, as measured in accordance with ASTM D790. In certain embodiments, the article made from the present composition has a flexural yield strength of greater than or equal to 34 MPa, as measured in accordance with ASTM D790. In certain embodiments, the article made from the present composition has a flexural yield strength from greater than or equal to 34 MPa to less than 40 MPa, as measured in accordance with ASTM D790. In certain embodiments, the article made from the present composition exhibits less than a 10% difference (or less than a 5% difference, or less than a 3% difference, or less than a 2% difference) with respect to a flexural yield strength in MPa, as measured by ASTM D790, compared to an article made from a composition without the (D) scavenger component.

In certain embodiments, the article made from the present composition has an impact strength (Notched IZOD) at 23° C. from 1 kJ/m$^2$, or 5 kJ/m$^2$, or 8 kJ/m$^2$ to 10 kJ/m$^2$, or 15 kJ/m$^2$, or 20 kJ/m$^2$, or 25 kJ/m$^2$, or 30 kJ/m$^2$, as measured in accordance with ISO 180. In certain embodiments, the article made from the present composition has an impact strength (Notched IZOD) at 23° C. of greater than or equal to 8.5 kJ/m$^2$, as measured in accordance with ISO 180. In certain embodiments, the article made from the present composition has an impact strength (Notched IZOD) at 23° C. from greater than or equal to 8.5 kJ/m$^2$ to less than 10 kJ/m$^2$ as measured in accordance with ISO 180. In certain embodiments, the article made from the present composition exhibits less than a 10% difference (or less than a 5% difference) with respect to an Izod impact strength (Notched IZOD) at 23° C. in kJ/m$^2$, as measured by ISO 180, compared to an article made from a composition without the (D) scavenger component.

In certain embodiments, the article made from the present composition has an impact strength (Notched IZOD) at −30° C. from 1 kJ/m$^2$, or 2 kJ/m$^2$, or 3 kJ/m$^2$ to 4 kJ/m$^2$, or 5 kJ/m$^2$, or 7 kJ/m$^2$, or 8 kJ/m$^2$, or 10 kJ/m$^2$, as measured in accordance with ISO 180. In certain embodiments, the article made from the present composition has an impact strength (Notched IZOD) at −30° C. of greater than or equal to 3.88 kJ/m$^2$, as measured in accordance with ISO 180. In certain embodiments, the article made from the present composition has an impact strength (Notched IZOD) at 23° C. from greater than or equal to 3.88 kJ/m$^2$ to less than 10 kJ/m$^2$, or less than 7 kJ/m$^2$, or less than 6 kJ/m$^2$, or less than 5 kJ/m$^2$ as measured in accordance with ISO 180. In certain embodiments, the article made from the present composition exhibits less than a 10% difference (or less than a 8% difference) with respect to an Izod impact strength (Notched IZOD) at −30° C. in kJ/m$^2$, as measured by ISO 180, compared to an article made from a composition without the (D) scavenger component.

In certain embodiments, the article made from the present composition has an odor grade of less than or equal to 5.1, in accordance with the odor grade test described below. In further embodiments, the article made from the present composition has an odor grade of less than or equal to 4.4, in accordance with the odor grade test described below. In certain embodiments, the article made from the present composition has no greater than a +0.2 difference in odor grade compared to an article made from a composition without the (D) scavenger component, in accordance with the odor grade test described below. In certain embodiments, the article made from the present composition has a lower odor grade, in accordance with the odor grade test described below, compared to an article made from a composition without the (D) scavenger component. Accordingly, in certain embodiments, the article made from the present composition has less odor compared to an article made from a composition without the (D) scavenger component. Indeed, in certain embodiments, the odor of an article made from a composition is reduced with addition, to the composition, of the (D) scavenger component comprising a polyacetoacetate compound having the Formula (I) and an amino alcohol compound having the Formula (II).

The present article may comprise one or more embodiments disclosed herein.

By way of example, and not limitation, examples of the present disclosure are provided.

EXAMPLES

Test Methods

Density is measured in accordance with ASTM D792, Method B. The result is recorded in grams (g) per cubic centimeter (g/cc or g/cm$^3$).

Melt Flow Rate (MFR) for polypropylene is measured in accordance with ASTM D1238, Condition 230° C./2.16 kilogram (kg) weight. The result is recorded in grams (g) eluted per 10 minutes (g/10 min).

Melt Index (MI) is measured in accordance with ASTM D1238, Condition 190° C./2.16 kilogram (kg) weight, also known as I$_2$. The result is reported g/10 min.

Notched IZOD Impact Strength is measured in accordance with ISO 180 at room temperature (23° C.) and at −30° C. The result is recorded in kilojoules (kJ) per square meter (kJ/m$^2$).

Tensile Modulus is measured in accordance with ISO 527. The result is recorded in megaPascal, or MPa.

Tensile Yield Strength is measured in accordance with ISO 527. The result is recorded in megaPascal, or MPa.

Flexural Modulus (Young's Modulus) is measured in accordance with ASTM D790. The result is reported in MPa.

Flexural Yield Strength is measured in accordance with ASTM D790. The result is reported in MPa.

Odor Grade Test: The odor grade is determined by a sensory evaluation similar to the VDA 270 test procedure. The detailed procedure is as follows. An aliquot of 10 g of sample pellets are put in a 1 liter glass vial and heated at 80° C. for 2 hours. After heating, the glass vial is cooled to 60° C. for sensory evaluation. The sensory evaluation is performed by 5 to 6 trained panelists who provide grades on odor based on the rankings described in Table 1. The reported results are the average grades of the panelists.

TABLE 1

| Grade | Description |
| --- | --- |
| 1 | Not perceptible |
| 2 | Perceptible, not disturbing |
| 3 | Clearly perceptible, but not disturbing |
| 4 | Disturbing |
| 5 | Strongly disturbing |
| 6 | Not acceptable |

VOC Test Method: Volatile Organic Chemical (VOC) testing is performed in accordance with the "VOC Test Method" described below, which is revised from the Toyota™ gas bag method TSM 0508G. In the following working examples, samples are prepared by weighing each component and extruding using a Coperon 18 mm extruder. The compounds are granulated into small pellets by a side cutter granulator. The granulated compounds are used for testing using the VOC Test Method described below.

The VOC Test Method is performed by weighing 200 g of a sample into a 10 liter (L) gas volume Tedlar™ PVF (polyvinyl fluoride) bag (from Delin Co. ltd, China), and then feeding 5 L of nitrogen into the bag. The bag is then stored at 65° C. for two hours before analysis. The nitrogen gas in the gas bag is then pumped out by an air pump for carbonyls analysis. Further details of the carbonyls analysis.

Carbonyl analysis is performed with a 4 liter sample from the bag. The sample is derivatized with dinitrophenylhydrazine (DNPH). Then, the carbonyl compounds are extracted and injected into a high-performance liquid chromatography (HPLC) column and separated using gradient elution. The separated compounds are then quantified by UV detection at 360 nm, with a detection limit of 0.001 mg/m$^3$. Carbonyl analysis provides the concentration of aldehydes, such as formaldehyde, acetaldehyde, acrolein, propionaldehyde, and crotonaldehyde present in the sample. Further details of the carbonyl analysis is provided in the paragraph below, as well as the HPLC conditions of Table 2.

DNPH cartridges (CNWBOND DNPH-Silica cartridge, 350 mg, Cat. No. SEEQ-144102, Anple Co. Ltd.) are employed to absorb the carbonyls emitted from the gas bag. The sampling speed is 330 mL/min and the sampling time is 13 min. After absorption, the DNPH cartridges are eluted with 1 gram (precisely weighed) of ACN, and the ACN solution is analyzed by HPLC to quantify the carbonyls in the sample. The standard solution with six DNPH derivatives (TO11A carbonyl-DNPH mix, Cat. No. 48149-U, 15 ppm for each individual compound, Supelco Co. Ltd.) is diluted by acetonitrile, and the final solution (0.794 ppm wt/wt) is restored in a 2 mL vial for instrument calibration at −4° C. (refrigerator). The 0.794 ppm (wt/wt) standard solution is injected into the HPLC system as a one point external standard for quantification of carbonyls in the sample. The first two peaks are identified as formaldehyde and acetaldehyde according to the standard specification. The response factor is calculated for each derivative according to the formula below:

$$\text{Response factor } i = \frac{\text{Peak Area } i}{0.794}$$

Where:

Response factor i=Response factor of derivative i

Peak Area i=Peak Area of derivative i in standard solution 0.794=standard concentration of 0.794 ppm The concentration of the aldehyde-DNPH derivative in the sample solution is calculated based on the formula below:

$$\text{Concentration of } i = \frac{\text{Peak Area } i}{\text{Response factor } i}$$

Where:

Concentration of i=Conc. of aldehyde-DNPH derivative in sample solution

Peak Area i=Peak Area of Derivative i in sample solution

Response factor i=Response factor of derivative i

The HPLC conditions are shown below in Table 2.

TABLE 2

| Instrument: | Agilent 1200 HPLC | | | |
|---|---|---|---|---|
| Column: | Supelco Ascentis Express C18, 15 cm*4.6 mm, 2.7 μm | | | |
| Mobile Phase: | Solvent A: 0.1% $H_3PO_4$ in Acetonitrile (ACN) | | | |
| | Solvent B: 0.1% $H_3PO_4$ in DI water | | | |
| Column Oven: | 15° C. | | | |
| Detection: | DAD detector at 360 nm | | | |
| Gradient: | Time (min) | % A | % B | Flow(mL/min) |
| | 0 | 45 | 55 | 1 |
| | 7 | 45 | 55 | 1 |
| | 14 | 50 | 50 | 1 |
| | 20 | 85 | 15 | 1 |
| | 25 | 100 | 0 | 1 |
| Equilibration Time: | 5 min | | | |
| Injection: | 10 μL | | | |

Materials

The materials used in the examples are provided in Table 3 below.

TABLE 3

| Material | Description/Properties | Source |
|---|---|---|
| YUPLENE ™ BX3900 | propylene impact copolymer density = 0.90 g/cc (ASTM D792) MFR = 60 g/10 min (ASTM D1238, 230° C./2.16 kg) | SK Global Chemical |
| ENGAGE ™ 8137 | polyolefin elastomer ethylene/octene copolymer density = 0.864 g/cc (ASTM D792) MI = 13 g/10 min (ASTM D792, 190° C./2.16 kg) | The Dow Chemical Company |
| Lonzamon ™ AATMP | AATMP ((2-ethyl-2-(((3-oxobutanoyl)oxy)methyl)propane-1,3-diyl bis(3-oxobutanoate) | Lonza Co. Ltd. |
| Tris amino | 2-amino-2-(hydroxymethyl)propane-1,3-diol | SCR Co. Ltd. |
| JetFil ® 700 | Talc | IMERYS |
| Irganox ® B225 | antioxidant | BASF |

Procedure

The control, comparative example (CE), and inventive examples (IE1 and IE2) are each prepared by weighing each component into a Coperon™ 18 mm extruder and extruding the composition. After extrusion, the composition is granulated into small pellets using a side cutter granulator manufactured by LABTECH Engineering company, Model: LSC-108. Pellets have a diameter of 2.3-3.0 mm and a length of 2.3-3.0 mm. The pellets are then molded into samples for testing. Table 4 shows the amount, in phr and approximate weight percent, of each component included in the control, comparative example, and inventive examples.

The pellets are tested for Volatile Organic Chemicals (VOC) via the VOC Method described above. The pellets are also tested for mechanical properties and via the odor grade test. The results are shown in Table 5. With regard to Table 5, ND stands for Not Detectable. A sample with an aldehyde content that is not detectable has an aldehyde content that is less than the detection limit of 0.001 mg/m$^3$ (i.e., from 0 mg/m$^3$ to less than 0.001 mg/m$^3$).

TABLE 4

| | Control | CE | IE1 | IE2 |
|---|---|---|---|---|
| Components in phr. | | | | |
| YUPLENE ™ BX3900 (phr) | 85 | 85 | 85 | 85 |
| ENGAGE ™ 8137 (phr) | 15 | 15 | 15 | 15 |
| Talc (phr) | 20 | 20 | 20 | 20 |
| Irganox ® B225 (phr) | 0.3 | 0.3 | 0.3 | 0.3 |
| AATMP (phr) | 0 | 0.25 | 0.25 | 0.25 |
| Tris amino (phr) | 0 | 0 | 0.025 | 0.1 |
| Components in approximate Weight Percent | | | | |
| YUPLENE ™ BX3900 (wt %) | 70.66 | 70.51 | 70.5 | 70.45 |
| ENGAGE ™ 8137 (wt %) | 12.47 | 12.44 | 12.44 | 12.43 |
| Talc (wt %) | 16.62 | 16.59 | 16.59 | 16.58 |
| Irganox ® BX225 (wt %) | 0.25 | 0.25 | 0.25 | 0.25 |
| AATMP (wt %) | 0 | 0.21 | 0.20 | 0.21 |
| Tris amino (wt %) | 0 | 0 | 0.02 | 0.08 |

TABLE 5

| | Control | CE | IE1 | IE2 |
|---|---|---|---|---|
| Odor Grade | | | | |
| | 4.9 | 5.3 | 5.1 | 4.4 |
| VOC Concentrations | | | | |
| Formaldehyde (mg/m$^3$) | 0.004 | ND | ND | ND |
| Acetaldehyde (mg/m$^3$) | 0.692 | 0.068 | 0.005 | ND |
| Acrolein (mg/m$^3$) | ND | ND | ND | ND |
| Propionaldehyde (mg/m$^3$) | 0.142 | 0.036 | ND | ND |
| Crotonaldehyde (mg/m$^3$) | ND | ND | ND | ND |
| Mechanical Properties | | | | |
| Tensile Modulus (MPa) | 1761.2 | 1736.36 | — | 1779.12 |
| Yield Strength (MPa) | 22.19 | 22.09 | — | 22 |
| Young's Modulus (MPa) | 1836.06 | 1837.43 | — | 1832.46 |
| Yield Strength (MPa) | 34.73 | 34.32 | — | 34.01 |
| Notched Izod (Model C) at 23° C. (kJ/m$^2$) | 8.12 | 7.81 | — | 8.51 |
| Notched Izod (Model C) at −30° C. (kJ/m$^2$) | 4.18 | 3.89 | — | 3.88 |

The control is representative of the state of the art of the automotive industry. As shown in Table 5, the comparative example (CE) shows that the addition of a polyacetoacetate compound (AATMP) advantageously reduces aldehyde concentrations compared to the control while maintaining the balance of mechanical properties. However, it is clear that the introduction of the polyacetoacetate compound alone increased the odor of the final TPO product compared to the control.

In contrast, the inventive examples (IE1 and IE2) surprisingly exhibited a similar or better reduction of aldehyde concentrations relative to the comparative example with limited impact on mechanical properties. Beyond this, the inventive examples have odor grades that are better than or comparable to a composition without the (D) scavenger component. Accordingly, the inventive example surprisingly shows that the combination of a polyacetoacetate compound and an amino alcohol compound exhibits aldehyde reduction while improving odor with limited impact on mechanical properties.

Without being bound by any particular theory, it is believed that the polyacetoacetate compound (AATMP) alone produces acid or acetone during hydrolysis that occurs under, for example, high temperatures, thereby introducing a stronger malodor in the final TPO product. The inventive examples overcome this problem. It is believed that small molecule amines, such as tris amino, are weak bases that help further boost aldehyde reduction while, at the same time, neutralizing the acids formed from decomposition of the polyacetoacetate compound (AATMP). Accordingly, the odor induced by the polyacetoacetate compound (AATMP) can be controlled via the combination with amine based chemistry.

It is specifically intended that the present disclosure not be limited to the embodiments and illustrations contained herein, but include modified forms of those embodiments including portions of the embodiments and combinations of elements of different embodiments as within the scope of the following claims.

What is claimed is:

1. A thermoplastic polyolefin composition comprising:
(A) a polypropylene polymer;
(B) an elastomer component;
(C) an additive component; and
(D) a scavenger component comprising a polyacetoacetate compound and an amino alcohol compound, wherein:
the polyacetoacetate compound has the Formula (I):

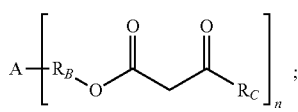

the amino alcohol compound has the Formula (II):

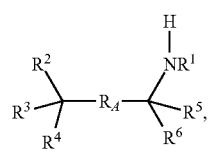

or a salt thereof, and wherein:
A is a polymer backbone, a $C_1$-$C_{30}$ substituted or unsubstituted linear or branched alkyl, aryl, arylalkyl, or alkaryl group, wherein the substituents may be one or more O, N, S, halogen, or phosphine;
$R_B$ is a bond or a $C_1$-$C_{30}$ linear or branched alkyl, aryl, arylalkyl, or alkaryl group;
$R_C$ is a substituted or unsubstituted $C_1$-$C_6$ alkyl group or a substituted or unsubstituted aryl group;
n is a number from 2 to 100;
$R_A$ is a bond or is $C(R^7R^8)$;
$R^1$ is H, OH or a $C_1$-$C_6$ alkyl group;
$R^2$ is H, OH or a $C_1$-$C_6$ alkyl group;
$R^3$, $R^4$, $R^5$, and $R^6$ are independently H or a $C_1$-$C_6$ alkyl group;
$R^7$ and $R^8$ are independently H, OH or a $C_1$-$C_6$ alkyl group;
wherein the $C_1$-$C_6$ alkyl group in $R^1$ to $R^8$ is optionally independently substituted with OH, $NR^9R^{10}$, a $C_1$-$C_6$ alkyl group, or a phenyl group, wherein $R^9$ and $R^{10}$ are independently H or a $C_1$-$C_6$ alkyl group, and
provided that if neither $R^7$ nor $R^8$ is OH, then at least one of $R^1$ and $R^2$ is OH.

2. A thermoplastic polyolefin composition comprising:
(A) from 29.99 wt % to 99.99 wt % of a polypropylene polymer;
(B) from 0 wt % to 70 wt % of an elastomer component;
(C) from 0 wt % to 40 wt % of an additive component; and
(D) from 0.01 wt % to 5 wt % of a scavenger component comprising a polyacetoacetate compound and an amino alcohol compound, wherein:
the polyacetoacetate compound has the Formula (I):

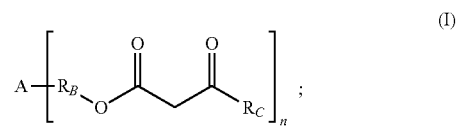

the amino alcohol compound has the Formula (II):

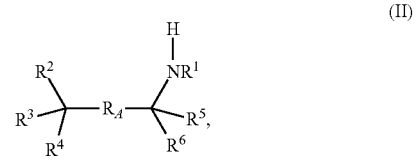

or a salt thereof, and wherein:
A is a polymer backbone, a $C_1$-$C_{30}$ substituted or unsubstituted linear or branched alkyl, aryl, arylalkyl, or alkaryl group, wherein the substituents may be one or more O, N, S, halogen, or phosphine;
$R_B$ is a bond or a $C_1$-$C_{30}$ linear or branched alkyl, aryl, arylalkyl, or alkaryl group;
$R_C$ is a substituted or unsubstituted $C_1$-$C_6$ alkyl group or a substituted or unsubstituted aryl group;
n is a number from 2 to 100;
$R_A$ is a bond or is $C(R^7R^8)$;
$R^1$ is H, OH or a $C_1$-$C_6$ alkyl group;
$R^2$ is H, OH or a $C_1$-$C_6$ alkyl group;
$R^3$, $R^4$, $R^5$, and $R^6$ are independently H or a $C_1$-$C_6$ alkyl group;
$R^7$ and $R^8$ are independently H, OH or a $C_1$-$C_6$ alkyl group;
wherein the $C_1$-$C_6$ alkyl group in $R^1$ to $R^8$ is optionally independently substituted with OH, $NR^9R^{10}$, a $C_1$-$C_6$ alkyl group, or a phenyl group, wherein $R^9$ and $R^{10}$ are independently H or a $C_1$-$C_6$ alkyl group, and
provided that if neither $R^7$ nor $R^8$ is OH, then at least one of $R^1$ and $R^2$ is OH.

3. The composition of claim 2, wherein the (D) scavenger component comprises a ratio of the polyacetoacetate compound having the Formula (I) to the amino alcohol compound having the Formula (II) of from 1:20 to 20:1.

4. The composition of any of the preceding claims, wherein the (B) elastomer component is an ethylene/α-olefin copolymer.

5. The composition of claim 1, wherein the (C) additive component comprises talc and an antioxidant.

6. The composition of claim 1, wherein:

$R_B$ is a C1 alkyl group or a substituted or unsubstituted ether moiety;

$R_C$ is a C1 or C2 alkyl group; and n is a number from 2 to 20.

7. The composition of claim 1, wherein the polyacetoacetate compound having the Formula (I) is selected from the group consisting of the following:

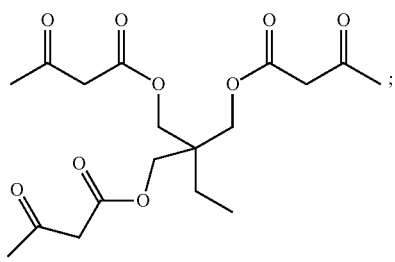

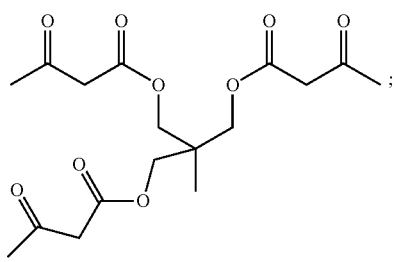

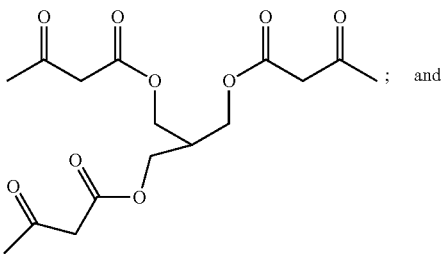

; and

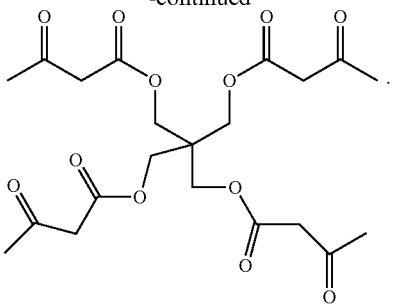

.

8. The composition of claim 1, wherein the amino alcohol compound having the Formula (II) is selected from the group consisting of 2-amino-1-butanol, 2-amino-2-ethyl-1,3-propanediol, 2-amino-2-methyl-1-propanol, 2-amino-1-methyl-1,3-propanediol, 2-amino-2(hydroxymethyl)propane-1,3-diol or tris (hydroxymethyl) aminomethane, N-isopropylhydroxylamine, ethanolamine, diethanolamine, N-methylethanolamine, N-butylethanolamine, monoisopropanolamine, diisopropanolamine, mono-sec-butanolamine, di-sec-butanolamine, and salts thereof.

9. The composition of claim 1, wherein the composition contains from 0 mg/m$^3$ to less than or equal to 0.05 mg/m$^3$ formaldehyde, from 0 mg/m$^3$ to less than or equal to 1 mg/m$^3$ acetaldehyde, from 0 mg/m$^3$ to less than or equal to 0.05 mg/m$^3$ acrolein, from 0 mg/m$^3$ to less than or equal to 0.05 mg/m$^3$ propionaldehyde, and from 0 mg/m$^3$ to less than or equal to 0.05 mg/m$^3$ crotonaldehyde, in accordance with the VOC Test Method.

10. The composition of claim 1, wherein the composition has a lower odor grade compared to a composition without the (D) scavenger component, in accordance with the Odor Grade Test.

11. The composition of claim 1, wherein the composition exhibits less than a 10% difference with respect to at least one of (i) to (vi) compared to a composition without the (D) scavenger component:
(i) a tensile modulus in MPa, as measured by ISO 527;
(ii) a tensile yield strength in MPa, as measured by ISO 527;
(iii) a flexural Young's modulus in MPa, as measured by ASTM D790;
(iv) a flexural yield strength in MPa, as measured by ASTM D790;
(v) an Izod impact strength in kJ/m$^2$ at 23° C., as measured by ISO 180; and
(vi) an Izod impact strength in kJ/m$^2$ at −30° C., as measured by ISO 180.

12. An article made from the composition of claim 1.

13. The article of claim 12 in the form of an automobile interior part.

* * * * *